United States Patent [19]

Kleinberg

[11] Patent Number: 4,603,306
[45] Date of Patent: Jul. 29, 1986

[54] TEMPERATURE SENSITIVE OSCILLATOR

[75] Inventor: Leonard L. Kleinberg, Greenbelt, Md.

[73] Assignee: The United States of America as represented by the Administrator, National Aeronautics and Space Administration, Washington, D.C.

[21] Appl. No.: 727,035

[22] Filed: Apr. 25, 1985

[51] Int. Cl.$^4$ ............................................. G01K 7/00
[52] U.S. Cl. ................................ 331/66; 331/108 D; 331/116 R; 374/183
[58] Field of Search ................. 331/66, 108 D, 116 R, 331/158; 340/584, 586, 595; 374/163, 183, 184

[56] References Cited

U.S. PATENT DOCUMENTS

| | | | |
|---|---|---|---|
| 3,867,689 | 2/1975 | Mori et al. | 324/40 |
| 3,879,992 | 4/1975 | Bartera | 73/30 |
| 4,039,969 | 8/1977 | Martin | 331/40 |
| 4,150,573 | 4/1979 | Iinuma et al. | 73/362 A R |
| 4,164,147 | 8/1979 | Kulwicki et al. | 73/362 R |
| 4,190,808 | 2/1980 | Fajen | 331/116 R X |
| 4,340,796 | 7/1982 | Yamaguchi et al. | 219/10.55 B |
| 4,371,271 | 2/1983 | Bellet | 374/183 |
| 4,377,733 | 3/1983 | Yamaguchi et al. | 219/10.55 B |
| 4,398,115 | 8/1983 | Gagnepain et al. | 310/313 A |
| 4,437,773 | 3/1984 | Dinger et al. | 374/117 |
| 4,468,634 | 8/1984 | Takagi et al. | 331/60 |

Primary Examiner—Eugene R. LaRoche
Assistant Examiner—James C. Lee
Attorney, Agent, or Firm—John O. Tresansky; John R. Manning; Ronald F. Sandler

[57] ABSTRACT

An oscillator circuit for sensing and indicating temperature by changing oscillator frequency with temperature comprises a programmable operational amplifier which is operated on the roll-off portion of its gain versus frequency curve and has its output directly connected to the inverting input to place the amplifier in a follower configuration. Its output is also connected to the non-inverting input by a capacitor with a crystal or other tuned circuit also being connected to the non-inverting input. A resistor is connected to the program input of the amplifier to produce a given set current at a given temperature, the set current varying with temperature. As the set current changes, the gain-bandwidth of the amplifier changes and, in turn, the reflected capacitance across the crystal changes, thereby providing the desired change in oscillator frequency by pulling the crystal. There is no requirement that a crystal employed with this circuit display either a linear frequency change with temperature or a substantial frequency change with temperature.

11 Claims, 1 Drawing Figure

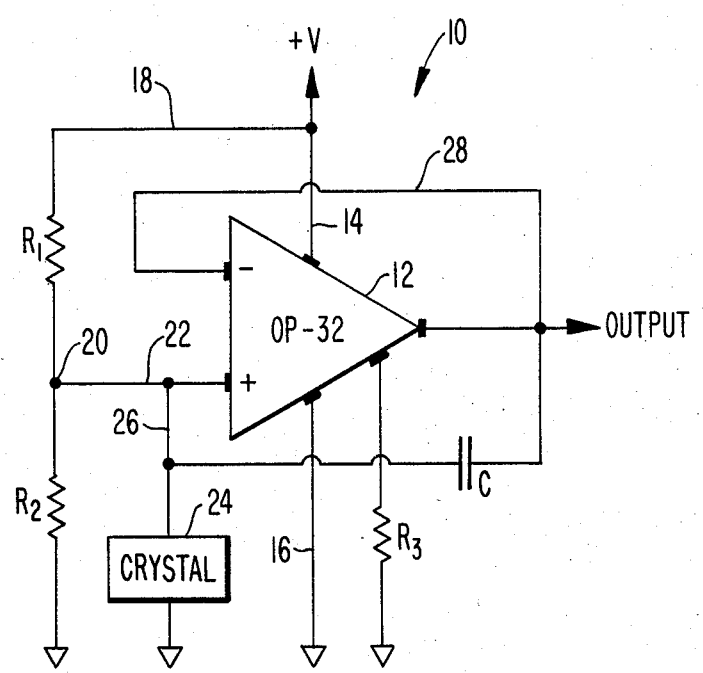

TEMPERATURE SENSITIVE OSCILLATOR

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention pertains to oscillators and more particularly, to a temperature sensitive oscillator.

BACKGROUND ART

Numerous oscillator circuits have been designed for the purpose of temperature sensing. All appear to require a component which varies with respect to some physical characteristic vis-a-vis temperature. This variation, in turn, is employed to affect the oscillator frequency, more or less, depending on design. Features of interest are often linearity, power consumption, physical size, frequency stability, quantum of frequency change versus temperature change and expense.

A fairly common practice is to employ a thermistor as a frequency determining element but a more common practice is to employ a temperature sensitive quartz crystal as the frequency determining element. Where a thermister is used to alter the frequency of an oscillator, circuit linearity and stability have proved to be unsatisfactory. When a quartz crystal has been used as a frequency determining element it has been necessary to use a crystal with a large linear temperature coefficient. These crystals must be specially cut and are relatively expensive.

The prior art does not include a relatively small, linear, low power, stable and inexpensive oscillator which may be used as a "throw-away", such as for ingestible thermometers.

STATEMENT OF THE INVENTION

Accordingly, it is an object of this invention to provide a temperature sensitive oscillator.

It is another object of the invention to provide a small, low power consumption oscillator.

It is yet another object of the invention to provide an oscillator which is frequency stable over a broad frequency range.

It is still another object of the invention to provide a temperature sensitive oscillator providing a frequency output which is linear over a broad temperature range.

It is a still further object of the invention to provide an oscillator using inexpensive components.

It is a yet further object of the invention to provide an ingestible thermometer.

Briefly, these and other objects are achieved in an operational amplifier oscillator circuit employing an ordinary, inexpensive crystal that can be pulled over a significant temperature range by reflecting a temperature variable capacitance that is produced, in turn, by a change in the gain-bandwidth product of a programmable operational amplifier.

BRIEF DESCRIPTION OF THE DRAWING

The sole FIGURE is a schematic representation of the temperature sensitive oscillator of this invention.

DETAILED DESCRIPTION OF THE INVENTION

The temperature sensitive oscillator 10 of the present invention is shown in the FIGURE as including a single operational amplifier 12, which may be an OP-32. This is a high-speed, high-gain, programmable operational amplifier manufactured by Precision Monolithics Incorporated of Santa Clara, Calif., among other companies. The programmability refers to the capability to vary power consumption, phase shift, slew rate, and most importantly for this application, bandwidth of the amplifier. The power supply terminal of the operational amplifier is connected by a lead 14 to a power supply while the ground terminal of the operational amplifier is connected by a lead 16 to ground. It should be understood that the OP-32, like many other operational amplifiers, may be powered by dual power supplies, one positive and one negative, and under such circumstances lead 16 would be connected to the negative supply rather than to ground. A resistive divider comprised of resistors $R_1$ and $R_2$ is connected between ground and the power supply terminal by lead 18. The juncture 20 of the resistors is connected to the non-inverting input of the operational amplifier via lead 22 for the purpose of establishing a bias with resistor $R_2$ grounded on the side remote from divider output 20. A crystal 24 is connected between ground to the non-inverting input of the operational amplifier via lead 26. The crystal generally, but not entirely, establishes the operating frequency of the oscillator circuit. A capacitor C is connected between the output and the non-inverting input terminals of the operational amplifier in a feedback configuration, and it also plays a part in establishing the operating frequency of the oscillator circuit. The manner in which the operational frequency is established will be explained more fully hereinafter.

The output and the inverting input terminals are connected by a lead 28 to place the circuit into a traditional "follower" configuration whereby the amplifier output will follow the input without inversion. To establish the set current of the amplifier, and thereby program the amplifier gain-bandwidth at an give temperature, a current limiting component, in this case resistor $R_3$, is connected between the amplifier program input terminal 30 and ground.

In the case of the embodiment shown, the power supply voltage V is +3 volts which may be furnished by a battery. A 3 volt supply was chosen as one which was acceptable in terms of the OP-32 supply voltage requirement, was very small in size and had a superior ampere-hour rating. The latter features are important when the operational amplifier oscillator is to be used as an ingestible thermometer which is intended to last for a considerable period of time within the body. Resistors $R_1$ and $R_2$ are both 2.2 MΩ and with the +3 V supply voltage, +1.5 V appears at the juncture 20 of the two resistors. Because the non-inverting input of the operational amplifier is a very high impedance, the divider is not loaded down and the +1.5 V divider voltage appears both at the non-inverting input and the amplifier output and becomes the D.C. voltage about which all oscillations will swing. The crystal 24, which is a 500 KHz crystal, only sets the approximate frequency of oscillation. This approximate frequency is modified by the reflected capacitance which is related to, but less than capacitor C. Capacitor C in this case is 50 pf. The amplitude of oscillation in this type of circuitry may be limited by the supply voltage, bias point, or the slew rate of the amplifier. However, in the particular type of application represented by the instant invention, the amplitude of oscillation is more often limited by the slew rate.

It is to be recognized that the invention is limited to those situations where the operational amplifier is being operated in its roll-off region, preferable in the 6 db per octave range. This is not a severe limitation because operational amplifiers typically exhibit a very large frequency range in the roll-off region. Where the oscillator is to be used as an ingestible thermometer, an operational frequency requirement of from about 250 KHz to 500 KHz exists because these frequencies can be transmitted rather freely from within the body to outside the body. A 1 MHz operational frequency would also be acceptable in terms of transmissibility through the body but is deemed unacceptable because of the possibility of interference with local AM radio reception. Further, miniature crystals are available in the 250 KHz to 500 KHz frequency range but are not available at 1 MHz. In this case, a 500 KHz crystal and the OP-32 operational amplifier were selected as mutually compatible. The OP-32 has an appropriate gain-bandwidth product at a reasonable supply current. The gain-bandwidth product is roughly twice the crystal frequency where the gain-bandwidth product is 1 MHz, i.e., at room temperature, and the quiescent current is very low, e.g., 100 ua. A 1 MHz gain-bandwidth product is important where the oscillator is to be used as an ingestible thermometer, i.e., to measure internal body temperature, because gain-bandwidth products of this order of magnitude result in a fairly large change in reflected capacitance for a relatively small change in temperature. This, in turn, results in a fairly large change in oscillator frequency for a small change in temperature, which is important because of the assurance, under these circumstances, that a given temperature reading can be reliably related to the body temperature rather than possibly be related to noise or instability.

At this point it should be emphasized that what has been disclosed in an oscillator to produce a given frequency at a given temperature and not how the oscillator frequency is changed with temperature. For the OP-32, the connection of resistor $R_3$ between the program input 30 and ground, with a value of 200 K$\Omega$, results in a set current (from the OP-32 specifications) of approximately:

$$I_{set} = \frac{+V - (1.1\ V)}{R_{set}}$$

where
+V=power supply voltage
1.1 V=approximate voltage drop across two forward biased diodes
$R_{set}$=resistance of set resistor, $R_3$ $$I_{set} = \frac{+3\ V - 1.1\ V}{200 K\Omega} = \frac{1.9 \times 10^{-6}\ V}{0.2\Omega} = 9.5\ ua$$

The set current establishes the bias on some of the operational amplifier internal circuits and establishes the gain-bandwidth of the operational amplifier. A change in the set current changes the gain-bandwidth of the operational amplifier. In the formula defining $I_{set}$, the 1.1 V represents the approximate voltage drop across two series connected, forward biased diodes which are internal to the operational amplifier behind the program input 30. Alternatively, an external biasing source may be used to establish the set current. This invention makes use of the fact that the set current established by resistor $R_3$ varies with temperature because the forward bias drop across the two series connected forward biased diodes is not temperature stable at 1.1 V but, rather, varies slightly with temperature. The forward bias drop across each diode changes by $-2$ mv/°C. This results in a change in $I_{set}$ with temperature which changes the gain-bandwidth. In turn, the change in gain-bandwidth with temperature changes the reflected output capacity with temperature which, in turn, pulls the crystal frequency. Thus, this change in set current with temperature has the effect of changing the oscillator frequency with temperature. More simply put, the invention relates to a temperature sensitive oscillator wherein an ordinary crystal (or other resonant circuit) can be pulled over a limited temperature range by reflecting a temperature variable capacitance which is produced by a change in the gain-bandwidth product of a programmable operational amplifier. With a proper design, as described, the change in oscillator frequency with temperature may be made significant considering the limited range of temperatures required to be tracked. For the purpose of tracking human body temperatures, a temperature range of from 30° C. to 40° C. is sufficient in 0.1° C. increments. A change of 100 Hz in oscillator frequency across this 10° C. range was deemed sufficient to avoid ambiguities in terms of noise or instability.

The theory of operation may be more easily understood by considering the analysis of an idealized operational amplifier in a follower configuration (1) $e_{in} - e_o = \epsilon$,
where
$e_{in}$=input voltage
$e_o$=output voltage
$\epsilon$=voltage difference between inverting and non-inverting inputs
(2) $e_o = K\epsilon$,
where
K=open loop gain
therefore, $e_o = Ke_{in} - Ke_o$ $$e_o \frac{(1 + K)}{K} = e_{in} \qquad (3)$$

$$K_r = \frac{K}{1 + K}, \qquad (4)$$

where
$K_r = e_o/e_{in}$
The input admittance to the amplifier looking into the non-inverting input of the amplifier, i.e., the driving point for $e_{in}$, may be expressed as:

$$Y_{in} = (1 - K_r) \times \frac{1}{Z}\ or, \qquad (5)$$

$$Y_{in} = \left(1 - \frac{K}{1 + K}\right) \times \frac{1}{Z} = \frac{1}{(1 + K)Z} \qquad (6)$$

In the case of the instant invention, Z is simply the capacitive reactance due to C.

The gain K of an operational amplifier may be written as a function of a given frequency in the following manner:

$$K_F = \frac{K_o}{1 + JF/F_3}, \quad (7)$$

where
- $K_o$ = the DC gain of the particular operational amplifier
- F = the operating frequency and,
- $F_3$ = the roll-off frequency at the 3 db point or corner frequency of the particular operational amplifier By approximating K at high frequencies we obtain;

$$K_F = \frac{1}{\frac{1}{K_o} + \frac{JF}{K_o F_3}} \quad (8)$$

where
- $K_F$ = the operational amplifier gain at high frequencies

Where $K_o$ is typically large, the expression $1/K_o$ approaches zero and $K_F$ may be defined as:

(9) $K_F = -JF_3 K_o / F$

Recognizing that the gain-bandwidth product is $F_3 K_o$, if we symbolize the gain-bandwidth product as $F_G$, equation (9) becomes: $K_F = -JF_G/F$ Another form of expression for $K_F$ is:

(10) $K_F = -J\omega_G/\omega$

Now recognizing that in the case of the instant invention, $Z = 1/J\omega C$, and by substituting $1/J\omega C$ into equation (6), equation (6) becomes:

$$Y_{in} = \frac{J\omega C}{1 + \left(\frac{\omega_G}{\omega}\right)^2} - \frac{\omega_G C}{1 + \left(\frac{\omega_G}{\omega}\right)^2} \quad \text{with} \quad (11)$$

$\dfrac{J\omega C}{1 + \left(\frac{\omega_G}{\omega}\right)^2}$ being the capacitive susceptance, and $-\dfrac{\omega_G C}{1 + \left(\frac{\omega_G}{\omega}\right)^2}$ being the negative input conductance.

From the embodiment shown, the required relationship to maintain oscillations is:

$$\frac{2}{R} - \frac{\omega_G C}{1 + \left(\frac{\omega_G}{\omega}\right)^2} \leq 0, \quad (12)$$

where R is the value of each bias resistor and both bias resistors ($R_1$, $R_2$) have the same value. The amplitude of the oscillation is, again, essentially determined by the slew rate.

The value of the capacitance reflected across the crystal may be expressed as:

$$C_{ref} = \frac{C}{1 + \left(\frac{\omega_G}{\omega}\right)^2} \quad (13)$$

This expression clearly shows that the reflected capacitance, in parallel with the crystal, is both frequency dependent and dependent on the feedback capacitor C and is capable of pulling the crystal a variable amount with frequency which, in turn, has the effect of changing the oscillator frequency.

From the OP-32 data sheet describing gain-bandwidth product versus supply current and supply current versus set current and the fact that there are two temperature variable diode drops (from two series diodes) in the set current circuit, the change in $F_G$ per degree centigrade may be determined by the equation:

$$\frac{\Delta F_G}{°C.} = 2 \times 10^3 \text{ Hz/°C.} \quad (14)$$

This represents a change of $-2.1$ mv/°C. for each diode. By using an $F_G$ value of $10^6$ Hz and an operating frequency F of $0.5 \times 10^6$ Hz, the approximate frequency of the selected crystal, $C_{ref}$, may be determined from equation (13) as:

$$C_{ref} = \frac{50 \text{ pf}}{1 + 4(1 + n \times 2 \times 10^{-3})^2} \quad (15)$$

where C = 50 pf and n = 0→10 and n represents an increment of temperature of 1° C.

The frequency of oscillation may then be given, as:

$$F_o = 0.5 \times 10^6 \left(1 + \frac{0.1}{C_{ref}}\right)^{\frac{1}{2}} \quad (16)$$

The motional capacitance which is internal to the selected crystal and relates to how much the crystal can be pulled is 0.1 pf and the loading capacitance of the selected crystal is 20 pf.

Using a computer or programmable calculator, the following frequencies are obtained for values of n ranging from 0 to 10 with 1° increments:

| Temperature (°C.) | Frequency (Hz) |
| --- | --- |
| 30 | 501,248 |
| 31 | 501,252 |
| 32 | 501,256 |
| 33 | 501,260 |
| 34 | 501,264 |
| 35 | 501,268 |
| 36 | 501,272 |
| 37 | 501,276 |
| 38 | 501,280 |
| 39 | 501,284 |
| 40 | 501,288 |

Thus, the increase in frequency is 4 Hz per degree centigrade and is linear. This is because the change in reflected capacitance has a quadratic content and the crystal frequency varies as the square root of the reflected capacitance. This situation is not ideal mathematically and, therefore, this necessitates the auspicious selection of both the operational amplifier in terms of a sufficient change in gain-bandwidth product for a given set current and the crystal in terms of a large motional capacitance which allows it to be pulled over a relatively large frequency range with a relatively small reflectance capacitance.

I claim:

1. A temperature sensitive oscillator comprising:
    a programmable operational amplifier with inverting and non-inverting inputs, an output, and a program input, said output being directly connected to said inverting input in a follower configuration;
    a resonant circuit connected to said non-inverting input;
    a current limiting component connected to said program input to limit set current; and
    a capacitor connected between said output and said non-inverting input.

2. The oscillator of claim 1 wherein said resonant circuit is a crystal.

3. The oscillator of claim 1 wherein said current limiting component is a resistor.

4. The oscillator of claim 3 wherein said resistor limits the set current from said program input, said current to be substantially invariable at a given temperature and significantly variable with variation in temperature.

5. The oscillator of claim 4 wherein a variation in said program set current is accompanied by a corresponding change in the gain-bandwidth of said operational amplifier.

6. The oscillator of claim 5 wherein a change in said gain-bandwidth is accompanied by a change in the reflected capacitance across said resonant circuit.

7. The oscillator of claim 6 wherein said change in said reflected capacitance changes the operating frequency of said operational amplifier.

8. The oscillator of claim 1 wherein said operational amplifier operates on the roll-off portion of its gain versus frequency curve.

9. The oscillator of claim 8 wherein said operation is on the roll-off portion where the gain about changes 6 db per octave.

10. A temperature sensitive oscillator comprising:
    an operational amplifier with inverting input, non-inverting input, output, and program terminals as well as power supply and ground terminals connectable respectively to a power supply and ground;
    said output terminal being directly connected to said inverting input terminal and connected to said non-inverting input terminal by a capacitor therebetween; a first bias resistor connected between said power supply terminal and said non-inverting input terminal and a second bias resistor connected between said non-inverting input terminal and said ground terminal;
    a crystal connected between said non-inverting input and said ground terminal; and,
    a resistor connected between said program terminal and said ground terminal.

11. A temperature sensitive oscillator comprising:
    a programmable operational amplifier having inverting and non-inverting input terminals, an output terminal, a program terminal, and power supply and ground terminals,
    circuit means for connecting said power supply and ground terminals across an energy source,
    circuit means for directly interconnecting said output terminal to said inverting input terminal,
    capacitative means connected between said output terminal and said non-inverting input terminal,
    a voltage divider connected across said power supply and ground terminals, and being directly connected to said non-inverting terminal at an intermediate voltage thereof,
    resistive means directly connected between said program and ground terminals for regulating the set current to establish the gain-bandwidth of said operational amplifier at a particular temperature, and
    crystal means having one side directly connected to said non-inverting terminal and to said output terminal via said capacitative means and another side directly connected to said ground terminal, said capacitative means affecting the operating frequency of said operational amplifier in response to the gain-bandwidth corresponding to the ambient temperature.

* * * * *